3,527,718
REGENERATING MIXED BED ANION AND CATION EXCHANGE RESINS

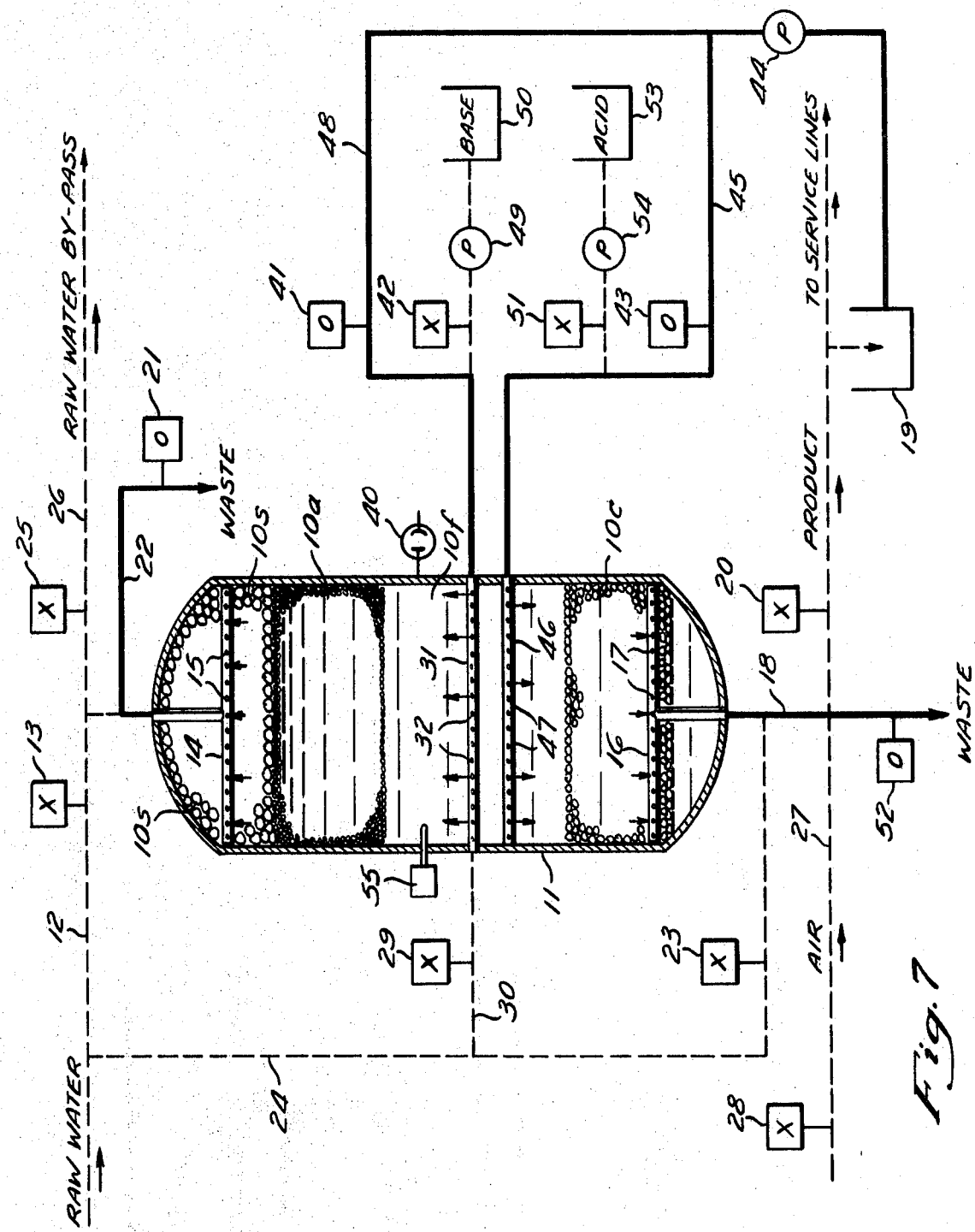

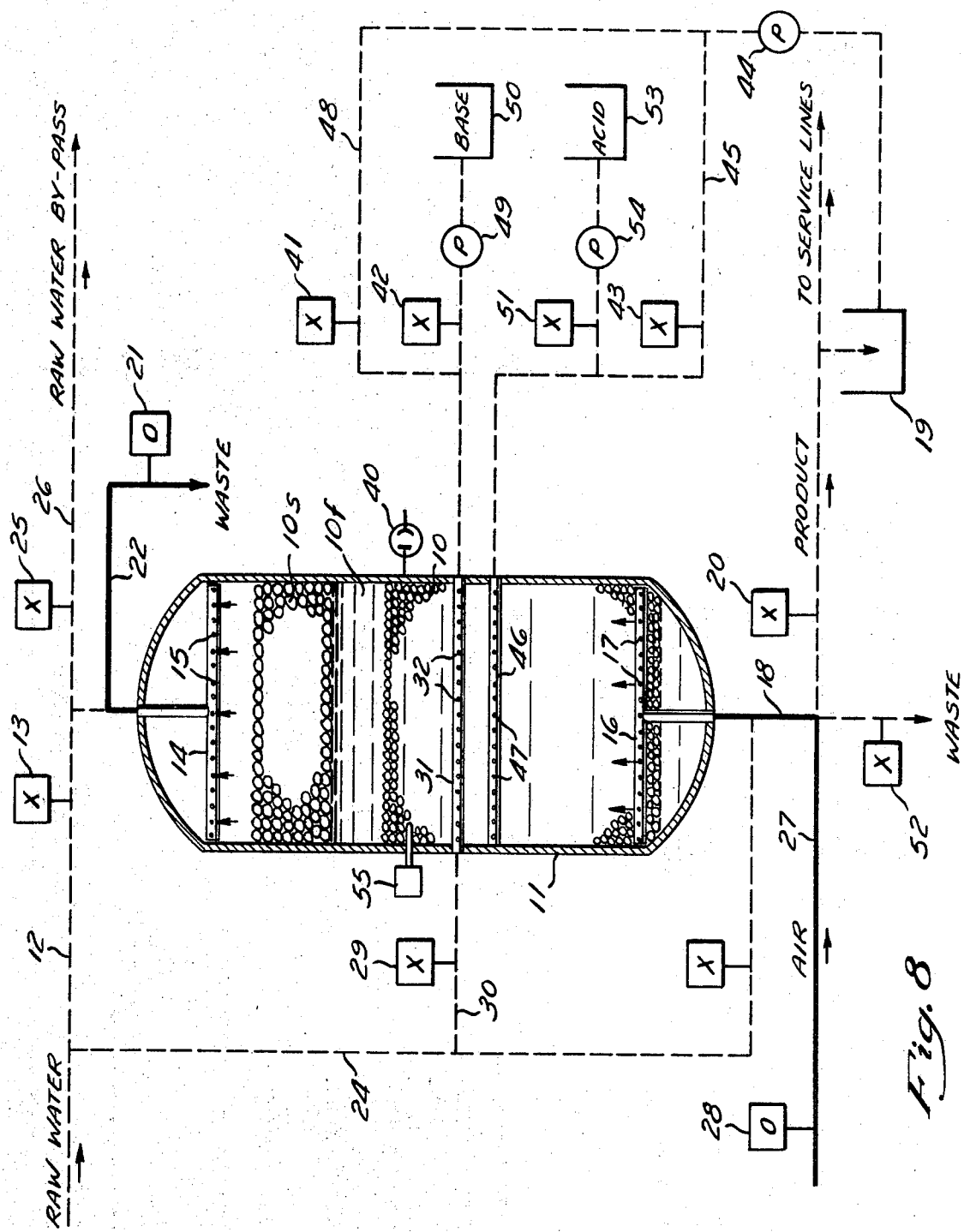

Arthur E. Coburn, Columbia Station, Ohio, assignor to The Scott & Fetzer Company, a corporation of Ohio
Filed Jan. 27, 1969, Ser. No. 794,135
Int. Cl. B01d 15/06
U.S. Cl. 260—2.1          8 Claims

ABSTRACT OF THE DISCLOSURE

A method and apparatus for regenerating mixed anion and cation exchange resins in a container. The mixed resins are stratified into separated layers by introducing a fluid into the bottom of the container at a rate which is sufficient to stratify and separate the anion and cation resins so that the stratified layers are physically separated and a fluid layer is interposed between the stratified resin layers. Anion and cation regenerating solutions are introduced into the container by distributor tube means in the fluid layer and between the stratified anion and cation layers so that the anion and cation regenerating solutions are respectively passed through the anion and cation resin layers and then out of the container.

BACKGROUND OF THE INVENTION

Anion and cation exchange resins are mixed together in a single bed to remove anions and cations from water which is passed through the mixed resin bed. The anion and cation exchange resins forming the mixed bed must be regenerated by separating the resins and then regenerating the anion resin with an alkaline regenerating solution and the cation resin with an acid regenerating solution.

One method of regenerating stratified layers of anion and cation resins is set forth in U.S. Pat. No. 2,771,424 to Stromquist et al. The Stromquist et al. patent sets forth a process which involves the steps of backwashing an exhausted mixed bed column of anion exchange and cation exchange materials of different densities by flowing fluid upwardly through the column to stratify the bed into an upper layer of the lighter (anion) of the exchange materials and a lower layer of the heavier (cation) material. A regenerating solution (alkaline) is passed downwardly through the anion layer while a blocking solution, which may be water or an acid regenerating solution, is passed upwardly through the lower layer of cation resin. The blocking solution flowing upwardly through the lower layer blocks migration of anion regenerating solution into the lower layer. If water is employed as the blocking solution, the cation resin layer is later regenerated with acid.

In order to accomplish these steps, Stromquist et al. provide a distributor head within a tank and position that distributor head in a horizontal plane which is spaced above the effective bottom of the tank a distance equal to the depth of the heavier of the two exchange materials when the latter are separated from each other. The regenerating solutions are drawn out of the tank through this intermediate distributor head to prevent migration of the blocking solution and the regenerating solutions into adjacent resin layers. Such prevention is important because regenerant migration precipitates calcium and magnesium hydroxides or sulfates, which plug the resin bed and distributors, and also cause a loss of resin capacity. However, since the anion and cation beds are contiguous, the rate of regenerant flow must be carefully controlled. If the flow is too fast, a relatively large percentage of the resin to be regenerated is by-passed as the regenerant flows to the intermediate distributor. If the flow is too slow, on the other hand, the regenerant will tend to migrate into the adjacent bed to thereby precipitate calcium and magnesium hydroxides or sulfates. Furthermore, during regeneration and service use of an ion exchange system, there is a loss or attrition of the resin which, in effect, changes the relationship between the resin-to-resin interface on the one hand and the fixed location of the intermediate distributor on the other hand. Thus, after a period of time, the resin-to-resin interface may be located either above or below the fixed intermediate distributor tube, with a consequent loss of capacity of the particular resin bed within which the distributor is located and consequent precipitation of hydroxides or sulfates.

SUMMARY OF THE INVENTION

According to this invention, mixed bed anion and cation exchange resins are regenerated by backwashing a column containing such resins at a rate which not only classifies the bed into separate anion and cation resin layers but which physically separates those layers so that a fluid layer is positioned between the resin layers. After the anion and cation beds are separated, a relatively low upward fluid flow is sufficient to maintain the anion bed in a compressed state against a screen at the upper end of the column. The anion bed is then regenerated by passing an alkaline solution through an intermediate distributor tube which is located in the intermediate fluid layer and upwardly through the anion bed. The alkaline solution flow is sufficient to maintain good separation during this stage of the operation. If desired, however, additional fluid may be introduced at the bottom of the column to maintain this separation. After the anion bed is regenerated, a rinsing fluid is directed through the intermediate distributor and upwardly through the anion bed. Upward flow of fluid through the anion bed is continued to maintain the anion bed in its separated state while the cation bed is regenerated by passing an acid solution through the intermediate distributor and downwardly through the cation bed. The cation bed is then rinsed and after regeneration of both beds, the anion bed is permitted to drop and the anion and cation exchange resins are mixed by introducing air through the entire column of resin.

OBJECTS OF THE INVENTION

In view of the foregoing, it should be appreciated that it is a principal object of the present invention to provide an improved technique for regenerating mixed bed iron exchange resins.

It is a more particular object of the present invention to provide a technique for regenerating anion and cation exchange resins by flowing a fluid through a column of such resins at a rate which is sufficient to stratify and physically separate the resins into separate anion and cation resin beds, and then, after such separation, directing regenerating solutions into the column in a space between the separated beds to separately regenerate the anion and cation exchange resins by alkaline and acid regenerating solutions.

It is a further object of the present invention to provide a technique for regenerating mixed bed ion exchange resins which will separate the resins into layers and which will maintain compaction during the regenerating step.

BRIEF DESCRIPTION OF THE DRAWINGS

FIGS. 2 through 8 are similar to FIG. 1, but illustrate progressive sequences in the operation of the regenerating cycle of the device.

DETAILED DESCRIPTION OF THE PREFERRED EMBODIMENT

Figure 1:
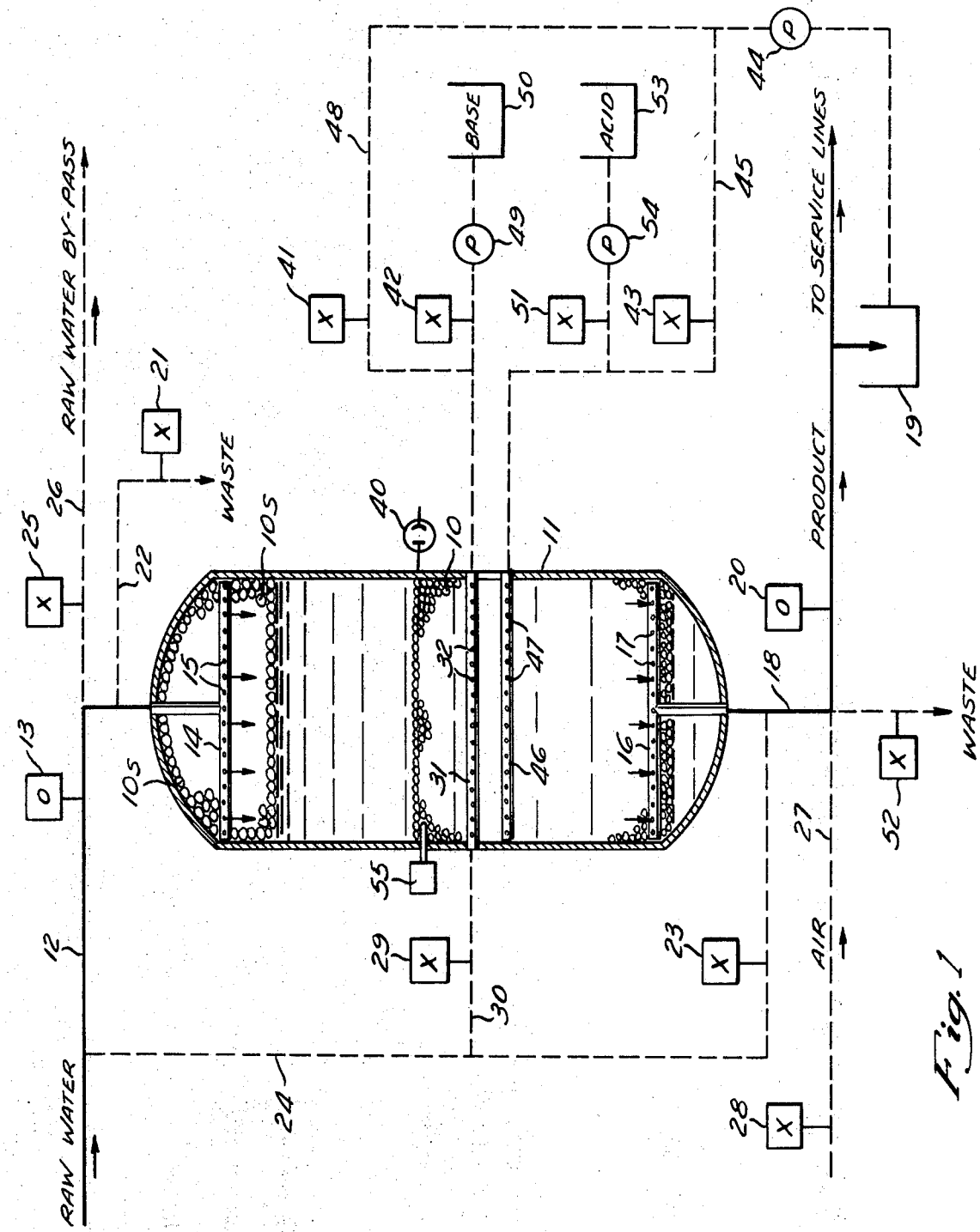
FIG. 1 is a vertical cross sectional view of an ion exchange apparatus according to this invention, showing associated valve and conduits diagrammatically, and illustrating the ion exchange system in its service cycle with non-operating lines in phantom, operating lines in solid, operating valves with a zero designator, and non-operating valves with an X designator.

Complete de-ionization of a solution is achieved in a mixed bed system by mixing a strongly basic anion exchanger with a strong acid cation exchanger in a tank. The service cycle of a mixed bed ion exchanger is illustrated in FIG. 1. A bed 10 comprising both anion and cation exchange materials is contained in a tank 11. The anion and cation exchange materials are intimately mixed to form the bed 10 and may comprise an anion exchanger having a lesser density than the cation exchanger. During the service cycle, raw water is introduced through a conduit 12 past an opened valve 13 and into the top of the tank 11. The conduit 12 is connected to an upper distributor 14 which has openings 15 arranged along its horizontal extent. The raw water flows downwardly through the mixed resin bed 10 and out of the tank 11 through a lower distributor 16 which has a plurality of openings 17 arranged along its horizontal extent. A conduit 18 is connected to the bottom of the tank 11 and communicates with the lower distributor 16. De-ionized water flows through the conduit 18 and past an opened valve 20 to fill a holding tank 19 and then to the service lines (not shown).

The service cycle of the ion exchanger may be terminated by a hardness monitor as a signal source, a sodium monitor as a signal source, a conductivity monitor as a signal source, or a specific ion monitor as a signal source (all not shown). These monitors may be used to limit the various levels or completeness of ionic removal. When any of these monitors emits a shutdown signal, the regenerating cycle of the ion exchanger is initiated in response to the signal source which closes the valves 13 and 20 and opens a valve 21 in a conduit 22 and opens a valve 23 in a conduit 24. Raw water is thereby diverted from the conduit 12 to the conduit 24 past the opened valve 23 and into the lower distributor 16. The water flows upwardly from the distributor 16 through the bed 10 and out of the tank 11 through the upper distributor 14. The water may then flow through the conduit 22 past the opened valve 21 or, optionally, the valve 21 may be closed and a valve 25 in a raw water by-pass conduit 26 may be opened.

Figure 2:
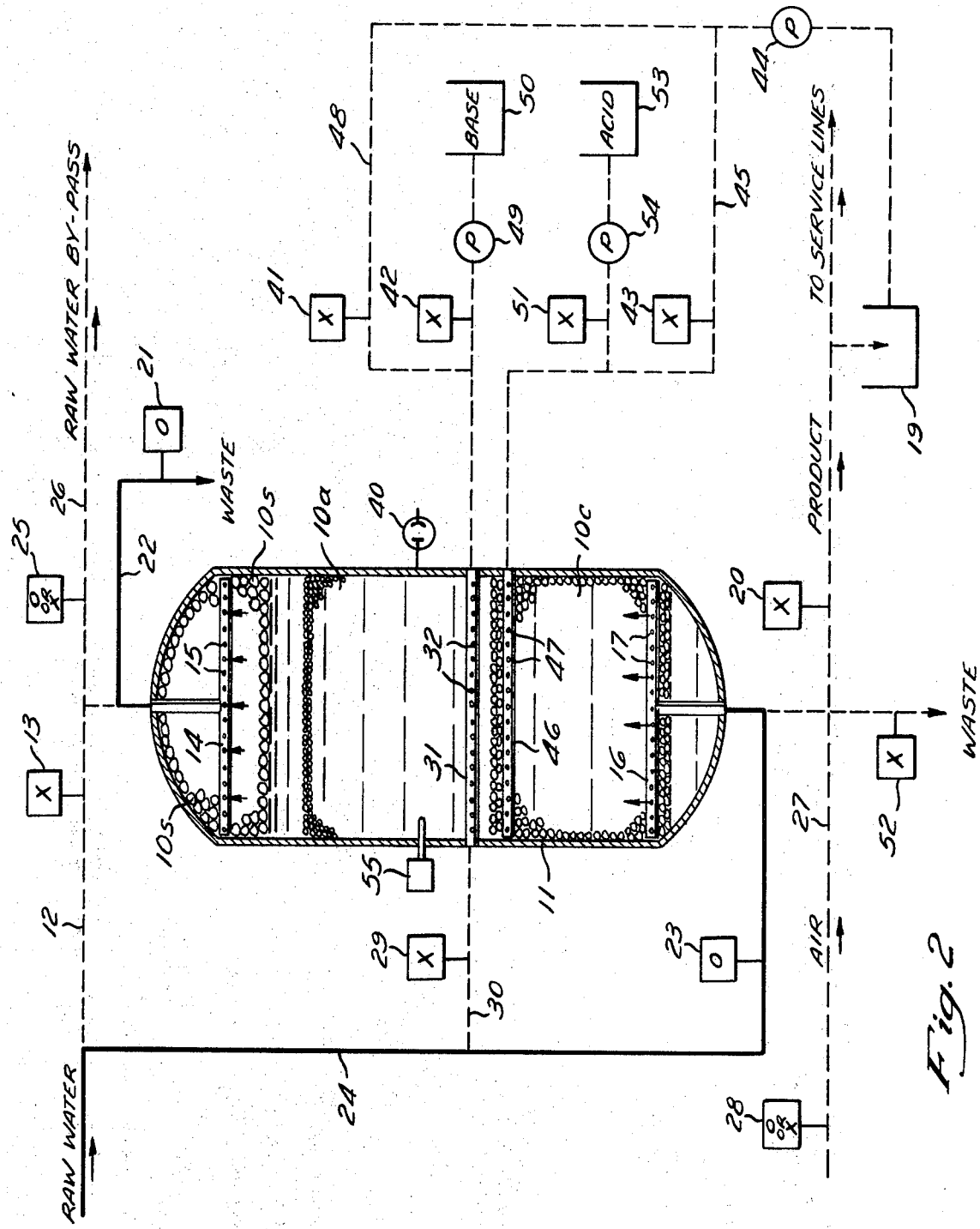

As may be seen in FIG. 2, upward flow of fluid through the tank 11 classifies the bed 10 into an upper layer 10a which consists of anion exchange resin and a lower bed 10c which consists of cation exchange resin. The anion exchange resin, having a lower specific gravity than the cation exchange resin, classifies on top of the heavier cation resin, and the entire bed 10 is expanded by the flow. It has been found that a flow rate of between about 4 to 10 gallons per minute per square foot will accomplish such stratification. This step not only classifies the ion exchange resins, but also backwashes the bed 10 to remove resin fines (finely broken particulate matter) by flowing those fines out of the tank 11 through the upper distributor 14. In order to prevent the exchange resin from being washed out of the tank 11, a suitable buoyant, inert screening material, such as buoyant polyethylene beads 10f or the like, permits the resin fines to pass but block the passage of resin out of the tank 11. The polyethylene beads 10f, therefore, float and act as a screen for the upper distributor 14 and are easily cleaned during the process.

Prior to admitting fluid into the tank 11 through the lower distributor 16, it may be necessary to blow air into the mixed bed for several minutes to break up any resin compacting which occurred during the service phase of the operation. To this end, there is provided a conduit 27 which is connected at one end to a source of pressurized air and at its other end to the conduit 18. Blowing air into the tank 11 is accomplished by opening a valve 28 which is provided in the conduit 27.

Figure 3:
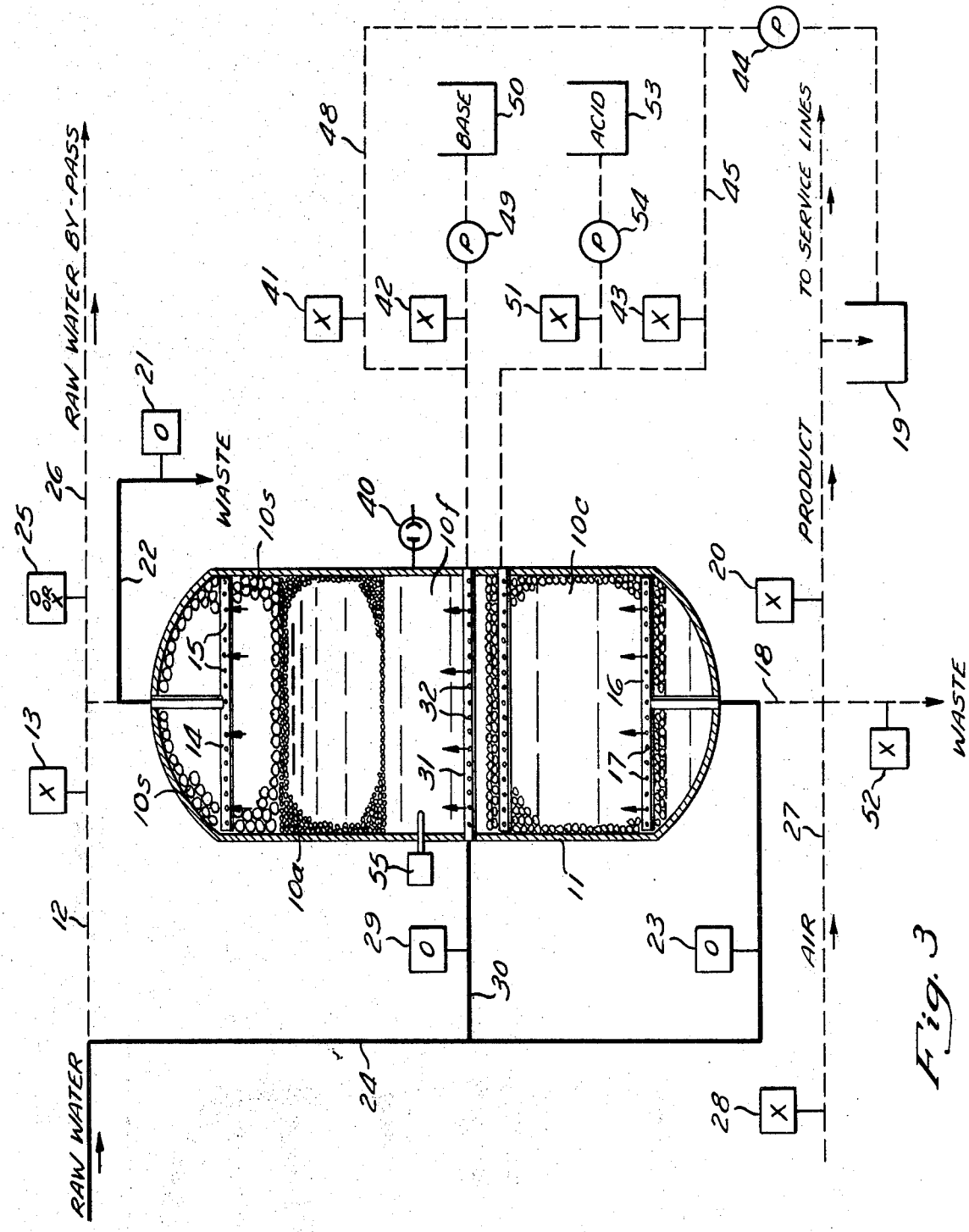

To physically separate the stratified anion and cation resin beds 10a and 10c, an additional stream of fluid is fed into the tank 11. As is illustrated in FIG. 3, this is accomplished by opening a valve 29 in a conduit 30. The conduit 30 leads from the conduit 24 to an upper intermediate distributor 31, which is positioned in the tank a small distance above the expanded cation bed 10c, as shown in FIG. 2.

The upper intermediate distributor 31 is provided with a plurality of openings 32 across its horizontal extent. The flow rate through the lower distributor 16 is continued at a rate of between about 4 to 10 gallons per minute per square foot, while the flow through the upper intermediate distributor 31 is at a rate of about 4 to 10 gallons per minute per square foot. Such flow rates lift the stratified anion bed 10a upwardly and compact the bed 10a against the beads at the top of the vessel. As may be seen in FIG. 3, the anion bed 10a is thereby physically raised as a unit and separated from the cation bed 10c by a fluid layer 10f.

Figure 4:
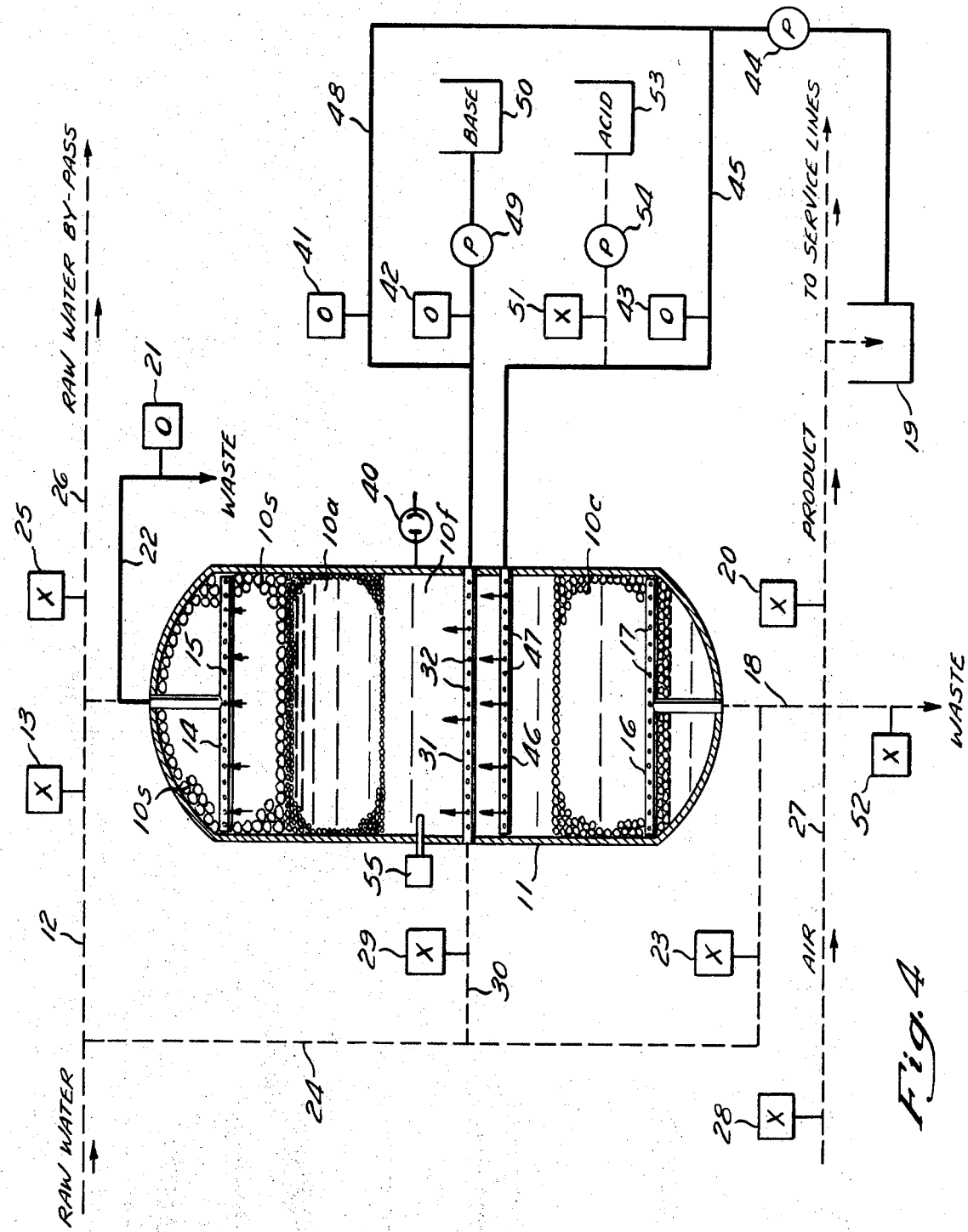

When the bed 10a reaches the position illustrated in FIG. 3, a photocell 40 or a conductivity probe (not shown) located just below the position of the now suspended bed 10a signals the start of the regeneration cycle as is shown in FIG. 4. In response to the signal emitted from the photocell 40 or the conductivity probe, valves 41, 42, and 43 are opened and, simultaneously, the valves 29 and 23 are closed. Closure of the valve 23 permits the cation bed 10c to settle to the position illustrated in FIG. 4. When the valve 43 is opened, a pump 44 pumps fluid from the reservoir 19 through a conduit 45 to a lower intermediate distributor 46 which is provided with a plurality of openings 47 across its horizontal extent.

With the anion bed 10a against the beads 10s at the upper end of the distributor, a relatively small fluid flow will maintain that position of the bed 10a. It has been found that a flow rate of about 0.1 to 1 gallon per minute per square foot is sufficient to maintain the bed 10a in its illustrated position.

Part of the flow from the reservoir 19 is through a conduit 48 past the valve 41 and this flow is combined with a regenerating solution, such as concentrated caustic, which is pumped by a pump 49 from a reservoir 50 and together with the fluid from the conduit 48 the now-diluted solution is delivered to the upper intermediate distributor 31. The regenerating solution is delivered at conventional pounds per cubic foot regenerant levels, as is required by the particular resin being treated. It should be appreciated that the suspending flow of fluid, which is illustrated as flowing from the lower intermediate distributor 46, may be from the lower distributor 16. In such a case, the conduit 45 may be connected to the lower distributor 16. In any event, it should be appreciated that upward flow from a location below the upper intermediate distributor 31 ensures that the regenerating solution will flow upwardly through the bed 10a and will not migrate into the cation bed 10c.

Figure 5:
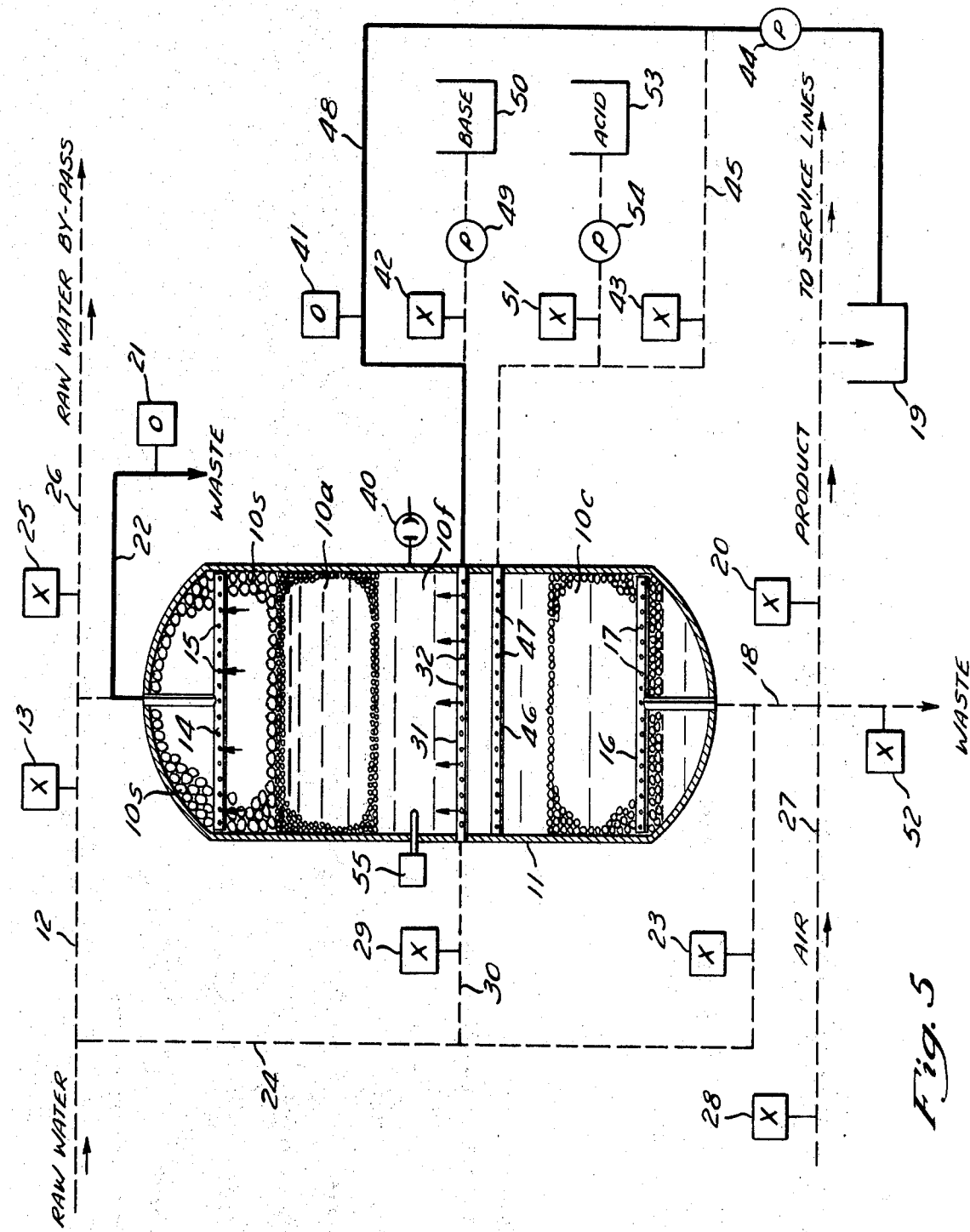

The end of anion regeneration is signalled by a suitably located conductivity probe, or may be terminated at the end of a predetermined time interval. When the bed 10a has been regenerated, and as is shown in FIG. 5, the valves 42 and 43 are closed while the valves 41 and 21 remain open. In this instance, the fluid flow is through the upper intermediate distributor 31 at a rate of between about 0.1 to 1 gallon per minute per square foot and the flow is continued so that the rinse volume is between about 10 to 12 times the volume of the anion bed 10a.

Figure 6:
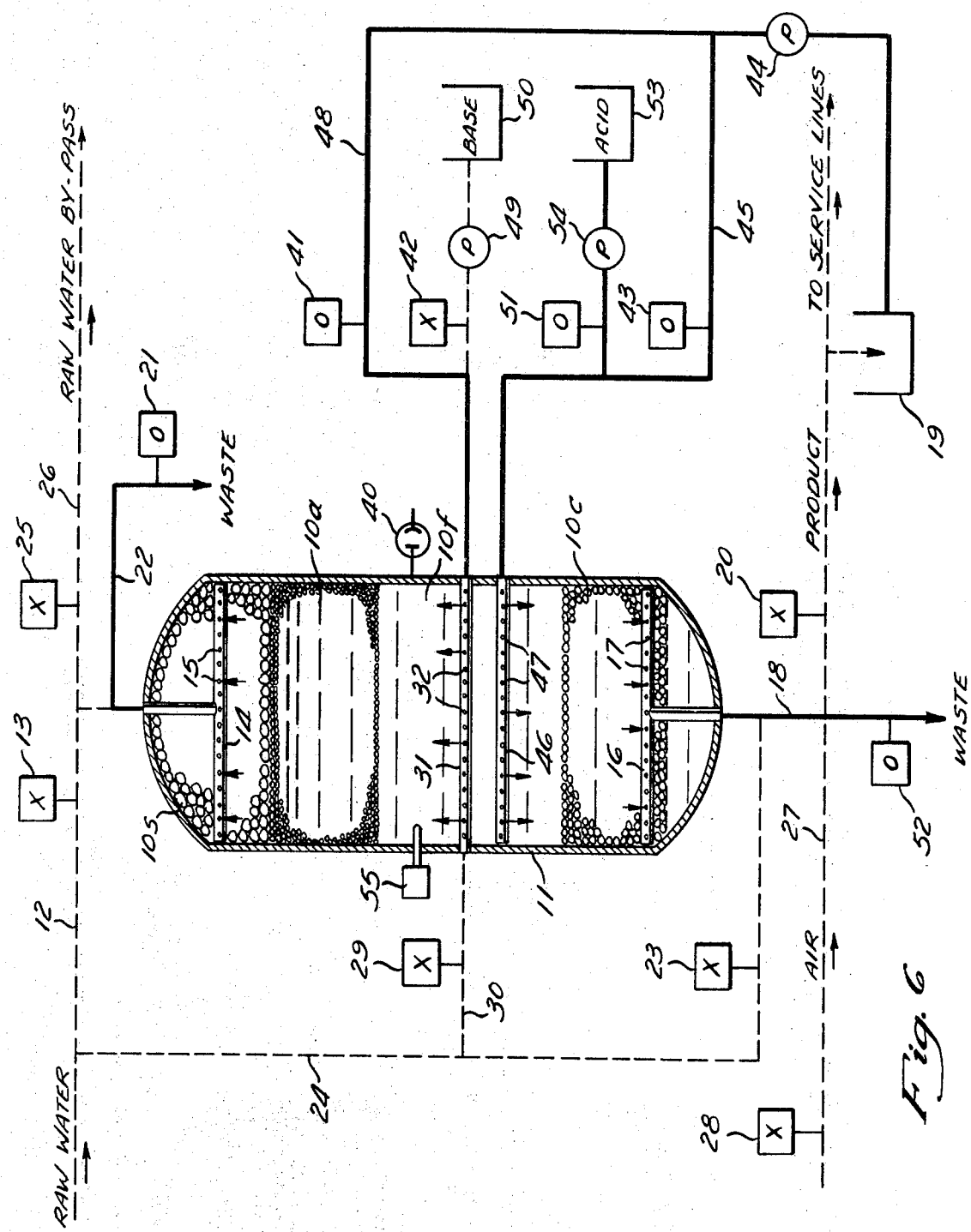

At the end of the anion rinse step, the lower cation bed 10c is regenerated. As is shown in FIG. 6, the cation regeneration step is initiated by opening the valve 43, a valve 51 and a valve 52, and by leaving the valves 21 and 41 open. The anion bed 10a is maintained in its suspended position during cation regeneration by adjusting or maintaining the flow past the opened valve 41 to the upper intermediate distributor 31 to or at a rate which is, in the upward direction, at least between about 0.1 to 1 gallon per minute per square foot. Part of the flow from the reservoir 19 is through the conduit 45 past the open valve 43 and into the lower intermediate distributor 46. Acid is fed into the conduit 45 from a reservoir 53 by a pump 54 past the open valve 51. The acid flows into the tank 11 at conventional pounds per cubic foot regenerant levels, as indicated by the type cation resin being treated. Flow from the lower intermediate distributor 46 is downwardly toward the lower distributor, since the valve 42 is open. Flow from the upper intermediate distributor 31 is upwardly toward the upper distributor 14, since the valve 21 remains open. This upward flow effectively ensures that the regenerant flow from the distributor 46 is in the downward direction, but in order to insure against acid migration into the anion bed, a conductivity probe 55 may be positioned within the tank just below the anion bed to monitor acid migration toward the anion bed 10a. If acid is detected by the probe 55, the valve 51 is closed manually or automatically throttled off, or the acid flow from the reservoir 53 is otherwise manually or automatically decreased momentarily in order to reestablish the proper flow direction.

After the bed 10c is regenerated in this manner, both beds are rinsed in the manner illustrated in FIG. 7. In order to rinse both beds, the valve 51 is closed, while the valves 21, 41, 43, and 52 remain open. Product water is pumped into the tank 11 through the upper and lower intermediate distributors 31 and 46 until conductivity probes (not shown) indicate complete rinsing of the beds 10a and 10c.

After the beds have been finally rinsed in this manner, the anion and cation exchange resins are intimately mixed for the service cycle of the ion exchanger. Referring to FIG. 8, this is accomplished by closing all of the valves except the valve 21, and first opening the valve 52 to lower the liquid level several feet. After the liquid level is lowered in this manner, the valve 52 is closed and the valve 28 is opened to blow air upwardly from the lower distributor 16 through the bed 10 to thoroughly mix the resins. After the resins are thoroughly mixed in this manner, the valves 28 and 21 are closed, and the valves 13 and 52 are opened. Flow is now downwardly through the tank 11 to compact and settle the bed 10, but is directed toward waste and not the service line so that the effluent quality may be checked. This is generally accomplished by a conductivity probe (not shown) in the conduit 18. If the effluent quality is proper, the valve 52 is closed and the valve 20 is simultaneously opened, so that flow is through the product conduit. Flow through the product conduit first fills the reservoir 19 and is then directed to the service lines.

The invention is not restricted to the slavish imitation of each and every detail set forth above. Obviously, techniques may be provided which change, eliminate, or add certain specific details without departing from the scope of the invention.

I claim:
1. A method for treating particulate solid materials having different specific gravities comprising the steps of flowing a fluid upwardly through a bed of said particulate solids at a rate which is sufficient to classify the materials into layers of different types of particulate materials, continuing upward flow at least from above a lower so-classified particulate layer at a rate which is sufficient to separate two so-classified particulate layers from each other and to provide a fluid layer between the two particulate layers, introducing a treating agent into said fluid layer and directing said treating agent through one of the separated layers.

2. A method according to claim 1 wherein two dissimilar treating agents are introduced into said fluid layer and wherein one treating agent is directed upwardly through an upper particulate layer and the other treating agent is directed downwardly through a lower particulate layer.

3. A method for treating dissimilar particulate solid materials by contacting each such material with its own fluid treating agent, comprising the steps of flowing a fluid upwardly through a mixed bed of said particulate solids at a rate which is sufficient to classify the materials into layers of different types of particulate materials, continuing upward flow at least from above a lower so-classified particulate layer at a rate which is sufficient to separate two so-classified particulate layers from each other and to provide a fluid layer between the two particulate layers, providing fluid treating agents for each of the two particulate layers, and flowing each treating agent through its own one of the two particulate layers but not through the other of the two particulate layers.

4. A method for treating particulate solid materials having different specific gravities by contacting each such material with its own fluid treating agent, comprising the steps of flowing a fluid upwardly through a mixed bed of said particulate solids at a rate which is sufficient to classify the materials into layers of different types of particulate materials, continuing upward flow at least from above a lower so-classified particulate layer at a rate which is sufficient to separate two so-classified particulate layers from each other and to provide a fluid layer between the two particulate layers, introducing two dissimilar treating agents into said fluid layer, directing one treating agent upwardly and through an upper particulate solid layer and directing the other treating agent downwardly and through a lower particulate solid layer.

5. A method for regenerating anion and cation exchange resins having different specific gravities by contacting each such resin with its own regenerating solution, comprising the steps of flowing a fluid upwardly through a mixed bed of said resins at a rate which is sufficient to classify the resins into layers of different types of resins, continuing upward flow at least from above a lower so-classified resin layer at a rate which is sufficient to separate two so-classified resin layers from each other and to provide a fluid layer between the two resin layers, providing regenerating solutions for each of the two resin layers, and flowing each regenerating solution through its own one of the two resin layers but not through the other of the two resin layers.

6. A method for regenerating anion and cation exchange materials by contacting each such resin with its own regenerating solution, said cation exchange resin having a greater specific gravity than the anion exchange resin, comprising the steps of flowing a fluid upwardly through a mixed bed of said resins at a rate which is sufficient to classify the resins into an upper anion resin layer and a lower cation resin layer, continuing upward flow at least from above the cation resin layer at a rate which is sufficient to separate the layers from each other and to provide a fluid layer between the resin layers, introducing anion and cation regenerating solutions into said fluid layer, directing the anion regenerating solution upwardly and through the anion exchange resin and directing the cation regenerating solution downwardly through the cation exchange resin layer.

7. A method for regenerating anion and cation exchange resins by contacting each resin with its own regenerating solution, said cation exchange resin having a greater specific gravity than the anion exchange resin, comprising the steps of flowing a fluid upwardly through a mixed bed of said resins at a rate which is sufficient to classify the resins into an upper anion layer and a lower cation layer, continuing upward flow at least from above the cation resin layer at a rate which is sufficient to separate the layers and to provide a fluid layer between the resin layers, introducing an anion regenerating solution into the fluid layer, directing the anion regenerating solution upwardly and through the anion exchange resin, introducing a rinsing solution into said fluid layer, directing said rinsing solution upwardly and through the anion exchange resin, introducing a cation regenerating solution into said fluid layer, directing said cation regenerating solution downwardly through the cation exchange resin while introducing a suspending fluid into the fluid layer and directing the suspending fluid upwardly to maintain separation of the anion and cation exchange resin layers, rinsing both anion and cation exchange resin layers by introducing rinsing fluid into the fluid layer and directing part of the rinsing fluid upwardly to rinse the anion exchange resin layer and directing part of the rinsing fluid downwardly to rinse the cation exchange resin layer, and mixing the regenerated anion and cation exchange resins into a single mixed bed.

8. A method for regenerating anion and cation exchange resins having different specific gravities by contacting each ion exchange resin with its own regenerating solution, comprising the steps of flowing a fluid upwardly through a mixed bed to said ion exchange resins at a rate which is sufficient to classify the resins into an upper anion exchange resin layer and a lower cation exchange resin layer, continuing upward flow at least from above the cation resin layer at a rate which is sufficient to separate the layers from each other, to provide a fluid layer between the resin layers, and to force the anion exchange resin layer against a screen means, reducing said upward flow to a flow rate which is sufficient to maintain the separation, introducing anion and cation regenerating solutions into the fluid layer, directing the anion regenerating solution upwardly and through the anion exchange resin layer, directing the cation regenerating solution downwardly and through the cation exchange resin layer while maintaining said upward flow at said reduced flow rate.

References Cited

UNITED STATES PATENTS

| | | | |
|---|---|---|---|
| 1,942,808 | 1/1934 | Dotterweich | 210—279 X |
| 2,666,741 | 1/1954 | McMullen | 210—290 X |
| 2,771,424 | 11/1956 | Stromquist et al. | 210—35 X |
| 2,803,347 | 8/1957 | Whitlock | 210—32 X |

SAMIH N. ZAHARNA, Primary Examiner

U.S. Cl. X.R.

210—35, 279; 252—179